(12) United States Patent
Hartman et al.

(10) Patent No.: US 7,281,630 B2
(45) Date of Patent: Oct. 16, 2007

(54) PACKAGING

(75) Inventors: Raul Hartman, Porvoo (FI); Ulla Uimonen, Salo (FI)

(73) Assignee: Nokia Corporation, Espoo (FI)

( * ) Notice: Subject to any disclaimer, the term of this patent is extended or adjusted under 35 U.S.C. 154(b) by 373 days.

(21) Appl. No.: 10/943,499

(22) Filed: Sep. 17, 2004

(65) Prior Publication Data

US 2006/0060481 A1    Mar. 23, 2006

(51) Int. Cl.
B65D 73/00    (2006.01)
(52) U.S. Cl. .................... 206/467; 206/471
(58) Field of Classification Search ........ 206/461–471, 206/320, 775
See application file for complete search history.

(56) References Cited

U.S. PATENT DOCUMENTS

| | | | | |
|---|---|---|---|---|
| 3,486,615 A | * | 12/1969 | De Woskin | 206/461 |
| 3,487,915 A | * | 1/1970 | Scott | 206/461 |
| 3,556,292 A | * | 1/1971 | Krzyzanowski | 206/464 |
| 4,962,849 A | * | 10/1990 | Anderson | 206/469 |
| 5,888,565 A | * | 3/1999 | Gics | 206/462 |
| 6,053,320 A | * | 4/2000 | Kuethe | 206/462 |
| 6,105,784 A | | 8/2000 | Salminen et al. | 206/775 |
| 6,502,701 B2 | * | 1/2003 | Shinada | 206/461 |

* cited by examiner

Primary Examiner—Luan K. Bui
(74) Attorney, Agent, or Firm—Ware, Fressola, Van Der Sluys & Adolphson LLP

(57) ABSTRACT

Packaging for an article provides tamper evident security for an article carried in a pre-shaped inner part that is received in a loose outer part that has pre-defined crease lines along which the outer part is folded to draw down and tighten the loose outer part around the pre-shaped inner part to seal close the inner part whereby the loose outer part must be broken or torn to remove the article. The packaging is arranged for hanging or stand alone display. The pre-shaped inner part is made of suitable material including paper pulp, colored paper pulp, clear or colored plastic, PLA. The loose outer part is made of suitable material including carton, paper, corrugated board, clear or colored plastic.

22 Claims, 9 Drawing Sheets

PACKAGING

FIELD OF THE INVENTION

The present invention relates to packaging for articles.

BACKGROUND OF THE INVENTION

It is desirable to package an article such as, a portable electronic device for example a mobile telephone, for sale display or storage, in such a way that the article can be seen without opening the package carrying the article. It is known in the prior art to form a tray-like packaging from two overlapping sheets of clear plastic wherein one or the other or both sheets have a preformed cavity or cavities formed therein having a general size and shape to accommodate the size and shape of the article placed in and carried or held sandwich-like within a chamber formed by the cavity defined between the two overlapping sheets. The plastic sheets may be thermoformed for example and are heat staked or otherwise bonded to one another such that the article is securely carried and protected by the packaging and yet remains visible. Descriptive information regarding the article, graphics, text, logo designs and the like relating to the product, manufacturer, sales promotion or product operation may be printed or otherwise carried on a sheet such as cardstock and the sheet is also sandwiched between the two overlapping plastic sheets for viewing. However, there are a number of disadvantages and drawbacks with such tray-like packaging. Typically, such tray-like packaging does not lend itself to easy display either by hanging on display hooks or in a stand-alone orientation on a shelf or flat display surface. Additionally, such tray-like packaging is also not secure in that the two overlapping sheets can be carefully separated without destroying the original internal packaging to remove the genuine original article and replacing it with a counterfeit or used article so it appears to be in the original packaging and therefore fooling or deceiving consumers into believing they are purchasing an original, genuine article.

It is also known in the prior art to form a packaging such as shown in FIG. 1 and generally designated 10 in which a hinged carton part 12 has peripheral inner facing marginal regions 14, 16 which are heat sealed or otherwise bonded to one another around a clear plastic part 18 that is sized, shaped and contoured to hold the article 20. The clear plastic part may be made by thermoforming, molding, extruding or in other ways known in the art. The hinged carton part 12 has a window or opening 22 in which and through which a portion of the clear plastic part 18 fits so the article 20 carried by the clear plastic part 18 can be viewed. The hinged carton part 12 has exposed surface areas that may be printed on to carry desired information regarding the article or other desired graphics, text, logos and the like as commonly known and used in the packaging trade. One or more surface areas 24 along the peripheral region of the hinged carton part 12 may be enlarged and arranged with an aperture or slot 26 that can be used to hang the packaging for display or storage purposes. Although the hinged carton packaging 10 provides a number of benefits and advantages, its construction and design lends itself to pirating and reuse for counterfeit or non-original products because the plastic part 18 (with the product) can be carefully removed from the sealed hinged carton part 12 and the original genuine product replaced with another imitation or counterfeit product. A further drawback to the hinged carton packaging solution is that the packaging configuration is easily copied by competitors and others without a major investment in development and production and such copying or imitation dilutes brand recognition of the carried product.

It is believed that a unique packaging solution for packaging articles that overcomes the disadvantages and the drawbacks of the prior art packaging would lead to greater security for such packaging. It is also believed that a unique packaging solution for packaging articles and products would enhance brand recognition of the products carried thereby and has applicability outside the area of electronic device packaging.

SUMMARY OF THE INVENTION

Accordingly, it is a principal object of the present invention to provide a unique packaging solution for packaging articles that provides tamper evident security for articles carried by the packaging.

It is an additional object of the present invention to provide a unique packaging solution for packaging articles that will enhance brand recognition for the article carried by the packaging.

It is a further object of the present invention to provide a unique packaging solution that has applicability outside the area of electronic device packaging.

In carrying out the objects of the invention herein, packaging for an article has a pre-shaped inner part including a cavity defined therein for carrying the article, and a loose outer part for receiving the pre-shaped inner part. The loose outer part has a number of predetermined crease lines along which material of the outer part is folded to draw down and tighten the loose outer part around the pre-shaped inner part to seal-close or encase the pre-shaped inner part within the loose outer part whereby the loose outer part must be broken or torn to remove the article carried by the pre-shaped inner part. The pre-shaped inner part has two oppositely disposed sidewalls, a top end wall transverse to and intersecting with one end of the sidewalls, a bottom end wall transverse to and intersecting with the end of the sidewalls opposite the one end wherein the top end wall, bottom end wall and side walls have inner and outer wall surfaces defining a thickness therebetween. Corners extend from the lower edges of the pre-shaped inner part and define a cut-out area or notch between respective extended corners. The sidewalls are further defined by a narrower thickness intermediate the ends than the thickness of the wall at the ends. The material of the outer part fits into the cut-out area between the extended corners at the sides of the packaging and is bonded to the surface of the bottom to tightly hold the pre-shaped inner part within the loose outer part when the packaging is in its final assembled configuration.

According to one aspect of the invention, the loose outer part further includes a hanging tab portion with a slot for hanging the packaging on a display hook for example.

According to another aspect of the invention, the loose outer part further includes a leg portion extending outwardly from the loose outer part whereby the packaging can be placed in a standing orientation supported by the edge of the leg portion and the bottom end wall edge of the pre-shaped inner part.

The pre-shaped inner part is made of a suitable material to carry out the intended purpose and function and includes paper pulp, colored paper pulp, clear or colored plastic, PLA and similar materials.

According to other aspects of the invention, the pre-shaped inner part may be constructed of an outer piece and an inner piece wherein the inner piece includes the cavity for carrying the article. The outer piece of the pre-shaped inner part has oppositely disposed outer wall surfaces having a shape and contour such that the wall surface tapers inwardly from its outer ends. The pre-shaped part outer piece is made of a suitable material to carryout the intended purpose and function and includes paper pulp, colored paper pulp, clear or colored plastic, PLA and similar materials.

Alternately, the inner piece is arranged to carry desired documentation.

The loose outer part is made of a suitable sheet material to carry out the intended purpose and function and includes, carton, paper, corrugated board, clear or colored plastic and similar materials.

WRITTEN DESCRIPTION OF PREFERRED EMBODIMENTS

Figure 1:
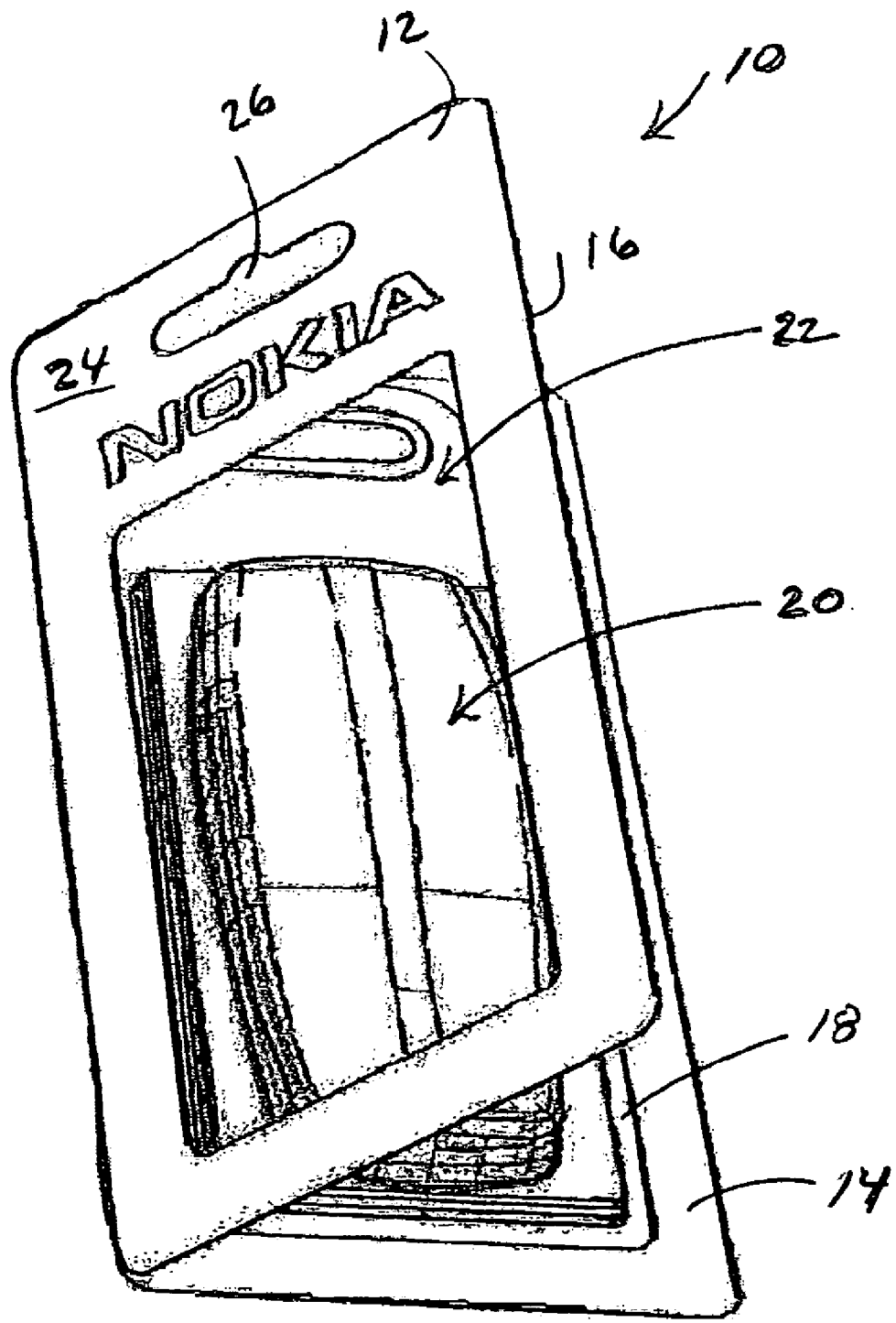
FIG. 1 is a schematic perspective view of a hinged carton packaging of the prior art.
Figure 2:
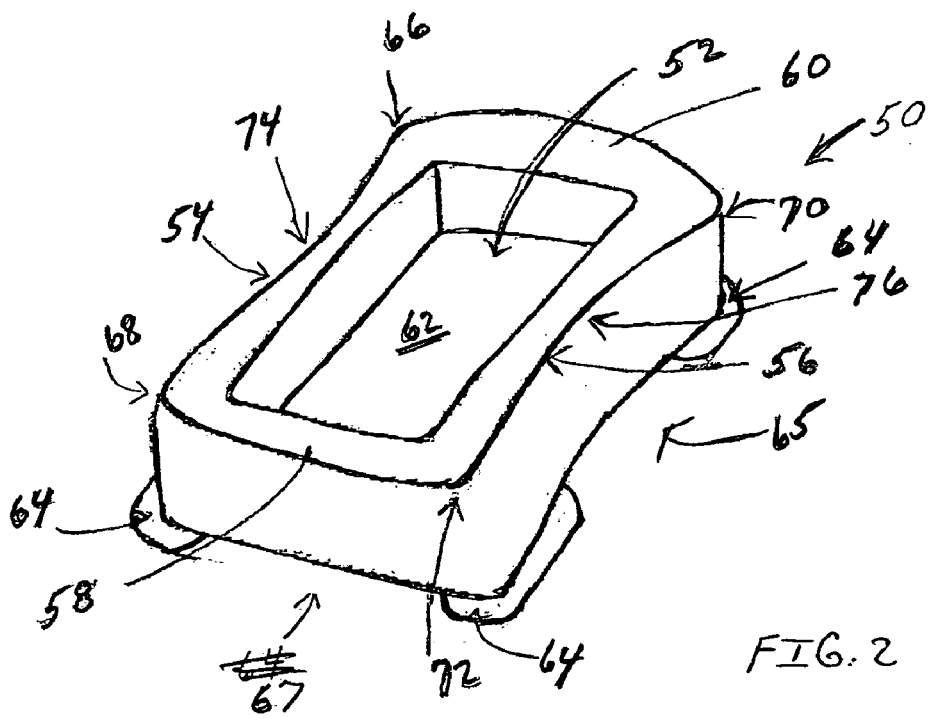
FIG. 2. is a schematic perspective view of a pre-shaped inner part of the packaging embodying the present invention.

Turning now to the drawings and considering the packaging embodying the invention in further detail, a schematic perspective view of a pre-shaped inner part generally designated 50 is illustrated in FIG. 2. The pre-shaped inner part 50 is substantially rectangular shaped although other shapes are contemplated to accommodate the desired packaging appearance. In FIG. 2, the pre-shaped inner part 50 includes a cavity generally designated 52 defined by sidewalls 54, 56 and intersecting lower wall 58 and intersecting upper wall 60 and the bottom or floor surface 62 of the inner part 50. The cavity 52 may be any of any desired size and shape to carry out the intended function. For example, the cavity 52 may have a size and shape to carry different articles within a generic shape. In another example, the cavity 52 may have a size and shape to carry a separate preformed secondary insert made of any of a number of different materials to carry the product or article. In a further example, the cavity 52 may have a size and shape corresponding to the specific size and shape of the article to be carried by the packaging. In the illustrated embodiment, the pre-shaped inner part 50 includes a peripheral flange generally designated 64 extending outwardly from and along the bottom of the pre-shaped inner part 50. The flange 64 may be continuous or segmented as desired to carry out the intended packaging construction and function as further described herein below. The cavity 52 is upwardly open to receive an article directly or to receive a secondary inner part with the article in the secondary inner part to be carried within the cavity 52. The purpose and function of the pre-shaped inner part 50 in this embodiment is to carry an article to permit viewing of the article when the pre-shaped inner part is assembled in the final packaging arrangement as will become apparent herein below. Preferably, although not necessarily required, the sidewalls 54, 56 of the pre-shaped inner part 50 are tapered inwardly from the respective ends 66, 68 and 70, 72 respectively. The purpose of the tapered shape of the walls 54, 56 will become apparent in the discussion of the final packaging arrangement with the pre-shaped inner part. The term "tapered shape" as used herein describes a generally inward arcuate or bow shaped wall profile as illustrated in FIG. 2 and thus the thickness of the walls 54, 56 is thinner in the central region 74, 76 than at the respective ends 66, 68 and 70, 72.

Figure 3:
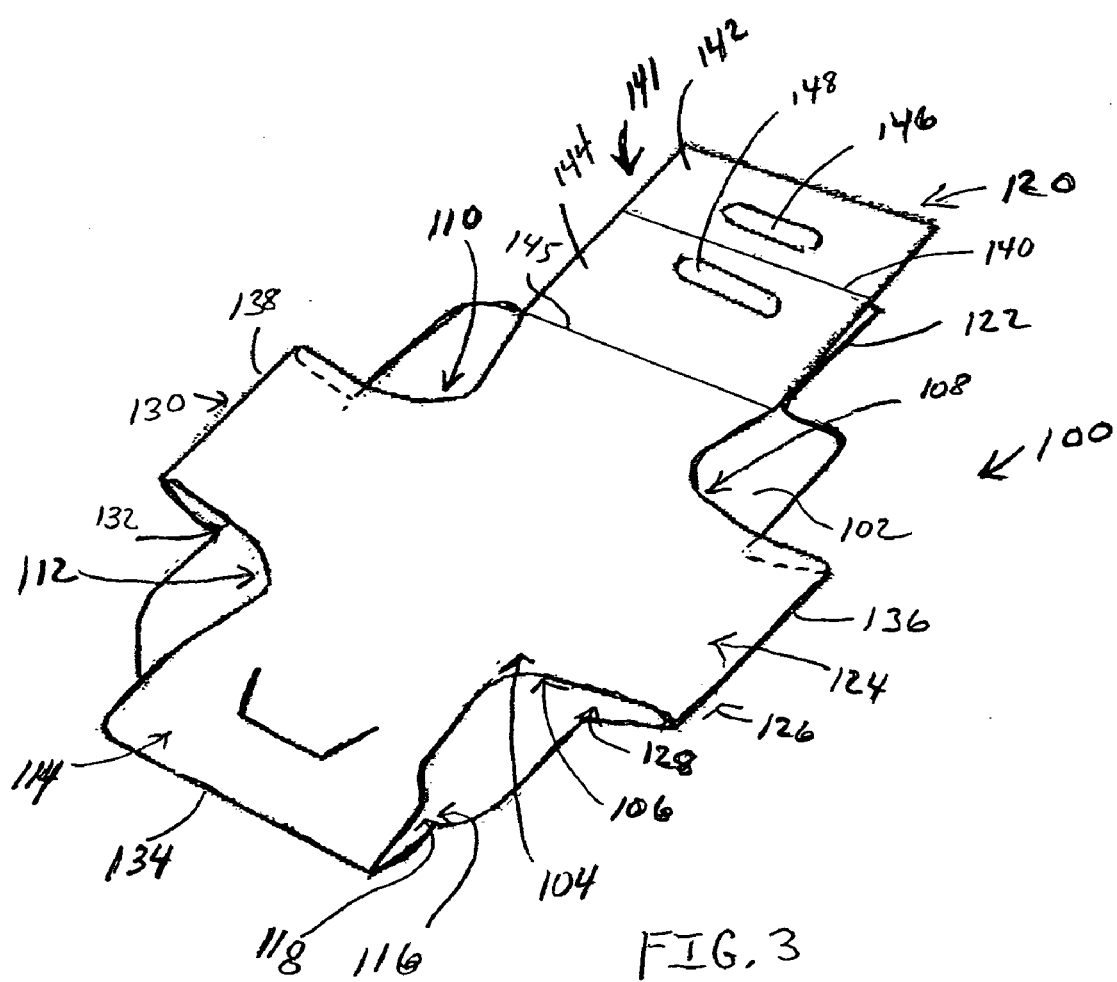
FIG. 3. is a schematic perspective view of a partially collapsed outer cover part of the packaging embodying the present invention.

Turning now to FIG. 3, in a first embodiment of the invention a schematic perspective view of a partially collapsed or folded outer cover part of the packaging is illustrated therein and generally designated 100. The outer cover part 100 is arranged to receive the pre-shaped inner part 50 when the outer cover part 100 is expanded to its unfolded configuration. The outer cover part 100 includes a bottom or floor 102, an upper cover portion 104 having notches 106, 108, 110, 112 cut from the corners of the material forming the cover 104 to define a generally longitudinal band 114 extending from and attached to the lower edge 116 of the bottom 102 along a lower end 118 of the band 114. The opposite end 120 of the band 114 extends beyond the upper extent of the bottom 102 and defines a flap portion generally designated 141. A further band 124 transverse to the band 114 is also defined in the upper cover portion by the notches 106, 108, 110, 112. The band 124 is connected at one end 126 to the bottom 102 along one end 128 of the band 124. The end 130 of the band 124 is connected to the bottom 102 at its end 132 to the side opposite the side 126. The outer cover part 100 collapses or is folded along the fold lines 134, 136, 138 into a compact substantially flat configuration as a result of the notches 106, 108, 110, 112 in the upper portion 104 of the outer cover part 100. The flap portion 141 of the band 114 is arranged with a fold line 140 to delineate and define a lower folding tab portion 142 and an upper folding tab portion 144 such that the tab 122 is sandwiched between the lower folding tab portion 142 and the upper folding tab portion 144 when the outer cover part 100 is in its final packaged arrangement configuration as will become apparent below. The tabs 142, 144 also include a notche or aperture 146, 148 in the lower folding tab portion 142 and the upper folding tab portion 144 respectively such that the apertures are in alignment and in alignment with a notch (notch not shown in the tab) in the sandwiched tab 122 to provide a means for hanging the final packaging as will become apparent below.

Figure 4:
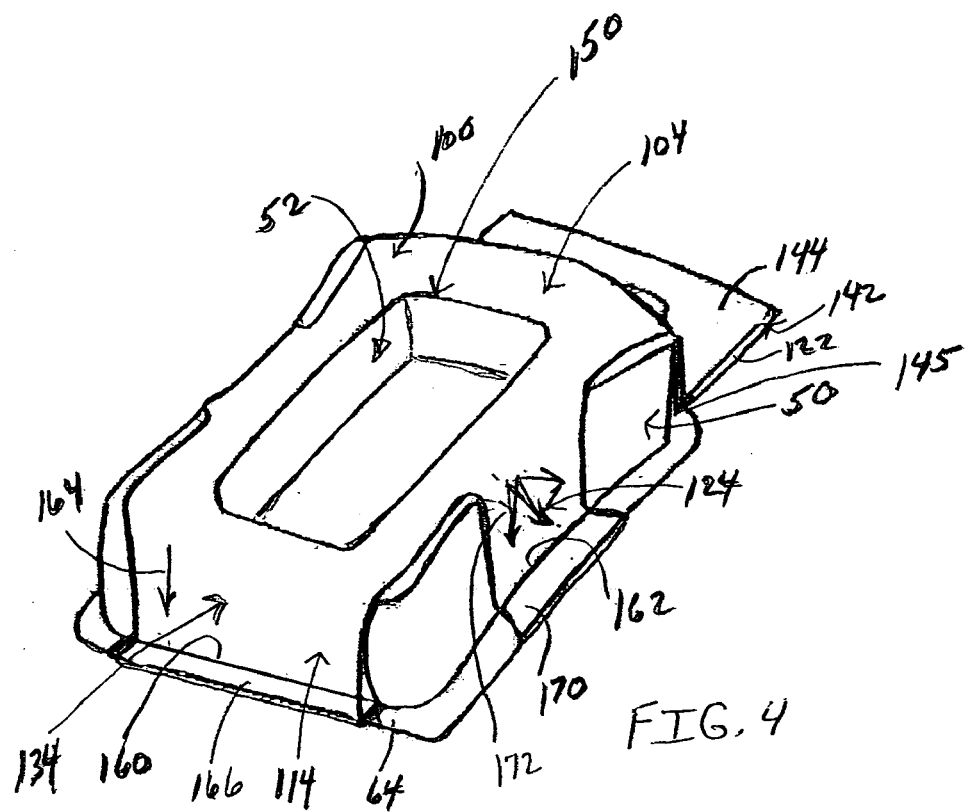
FIG. 4 is a schematic perspective view of the packaging embodying the present invention showing the pre-shaped inner part enclosed and captured by the outer cover part.

Turning now to FIG. 4, a schematic perspective view of the final assembled packaging embodying the present invention is illustrated therein and shows the pre-shaped inner part 50 enclosed and captured by the outer cover part 100 to form the. As illustrated in FIG. 4, the outer cover part 100 includes a window or aperture 150 through the upper portion 104 in general or partial alignment with the cavity 52 defined within the pre-shaped inner part 50. The outer cover part 100 is tightened around the pre-shaped inner part 50 to enclose or encase the pre-shaped inner part 50 by folding a portion of the band 124 along a pre-defined crease line 162 such that a portion 170 of the material defining the cover portion 104 folds inwardly of the flange portion 64 into the cut-out area 65 of the flange 64 to draw down and tighten the cover 104 as indicated by the direction arrow 172. Likewise a portion of the band 130 is folded along a pre-defined crease line (not shown) such that the material defining the cover portion 104 folds inwardly of the flange portion 64 into the cut-out area in the flange 64 on the side opposite the cut-out area 65. The bonding creating the enclosure of pre-shaped inner part 50 within outer cover part 100 is achieved with a suitable adhesive, preferably heat sealable, prepared appropriately and applied on the interior side surface of the outer cover part 100. The bonding is created between folding tab portion 170 and the corresponding portion of the bottom 102 of the outer cover part. Likewise, the bonding on the opposite side is similarly arranged. A portion of the band 134 folds along a pre-defined crease line 160 such that a portion 166 of the material defining the cover portion 104 folds inwardly of the flange portion 64 into the cut-out area 67 of the flange 64 to draw down and tighten the cover 104 as indicated by the direction arrow 164. The portion 166 is likewise bonded using a suitable adhesive applied on the interior side surface of the outer cover part 100 to bond to the material on either side of the cut-out area 67 of the flange 64 or to the bottom surface 102 to form the final packaging arrangement. The flap portion 141 of the band 114 is likewise tightened around the pre-shaped inner part 50 by folding the folding tab portion 142 along the crease line 140 and under the tab 122 to sandwich the tab 122 between the lower folding tab portion 142 and the upper folding tab portion 144. The upper folding tab portion 144 is also folded along the crease line 145 to tighten the outer cover part around the pre-shaped inner part 50. A suitable adhesive applied on the interior side surface of the flap portion 141 bonds a portion of the material defining the cover portion 104 that is folded inwardly to and against the tab 122 and bottom surface 102.

The pre-shaped inner part 50 may be made of any suitable material including paper pulp, plastic, PLA, or other suitable material to carry out the intended function. Likewise, the outer cover part 100 may be made of any suitable sheet material including carton, paper, corrugated board, plastic, or other material well known in the art to carry out the intended function. The completed packaging provides a secure packaging in which an article carried within the packaging can only be removed by damaging or destroying the cover material and thus a tamper evident visual alert that the contents of the packaging may have been tampered with or otherwise altered is provided.

Figure 5:
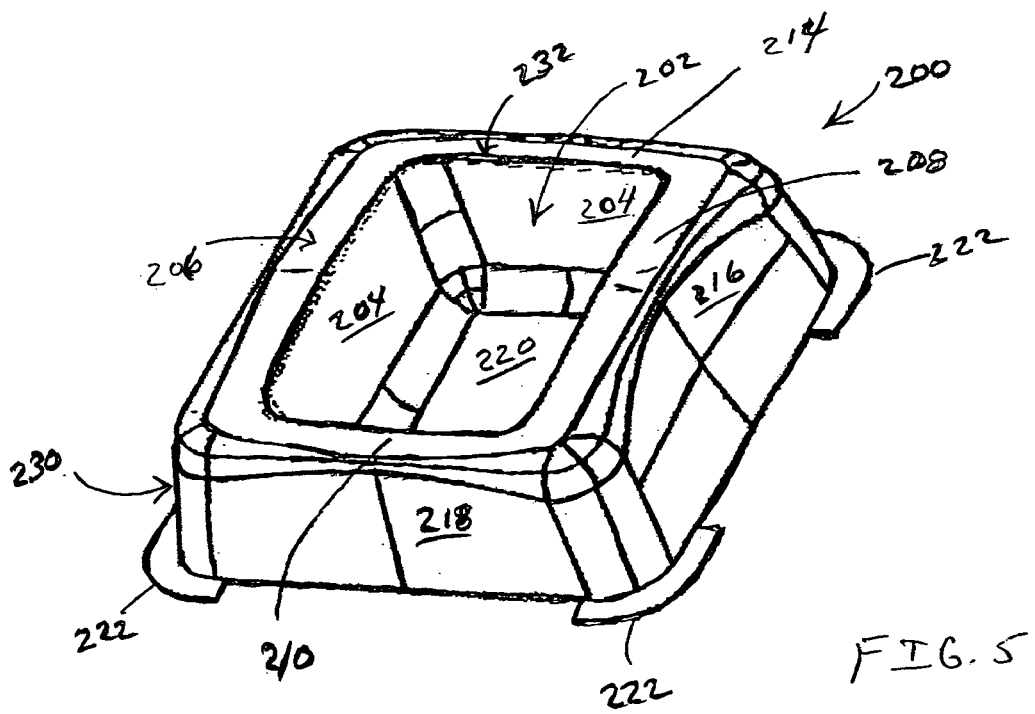
FIG. 5 is a schematic perspective view of an alternate embodiment of the pre-shaped inner part of the packaging of the present invention.

Turning now to FIG. 5, a schematic perspective view of an alternate embodiment of the pre-shaped inner piece or part of the packaging embodying the present invention is illustrated therein and generally designated 200. The pre-shaped inner part 200 has an upwardly open chamber or cavity 202 defined within the pre-shaped inner part 200. The cavity 202 is formed between the inner surfaces 204 of the oppositely disposed sidewalls 206, 208 and intersecting transverse walls 210, 214 and an intersecting bottom surface 220. The exterior surface 216, 218 of the sidewalls 206, 208 and end walls 210, 214 respectively are contoured arcuately inward toward the central portion of the walls and provide a taper-like profile. The pre-shaped inner part 200 includes extended corners 222, 222 extending outwardly from each bottom corner of the pre-shaped inner part 200. The pre-shaped inner part 200 may be made of a single piece utilizing well known vacuum forming techniques and other suitable techniques for making such parts as is well known to those skilled in the art. Likewise, the pre-shaped inner part 200 may also be made of an outer piece generally designated 230 and a separate inner piece in any of a number of different forms and shapes configured to be inserted into and carried by the outer piece 230. The inner piece can be used to support the product or to position it in a specific orientation and/or location inside the cavity 202. The outer piece 230 may be made of any suitable material including paper pulp, colored paper pulp, clear or colored plastic, PLA, or other materials well known as those skilled in the art. The pre-shaped inner part may be made of a clear or colored plastic, PLA, or other suitable material well known to those skilled in the art to carry out the intended function.

Figure 6:
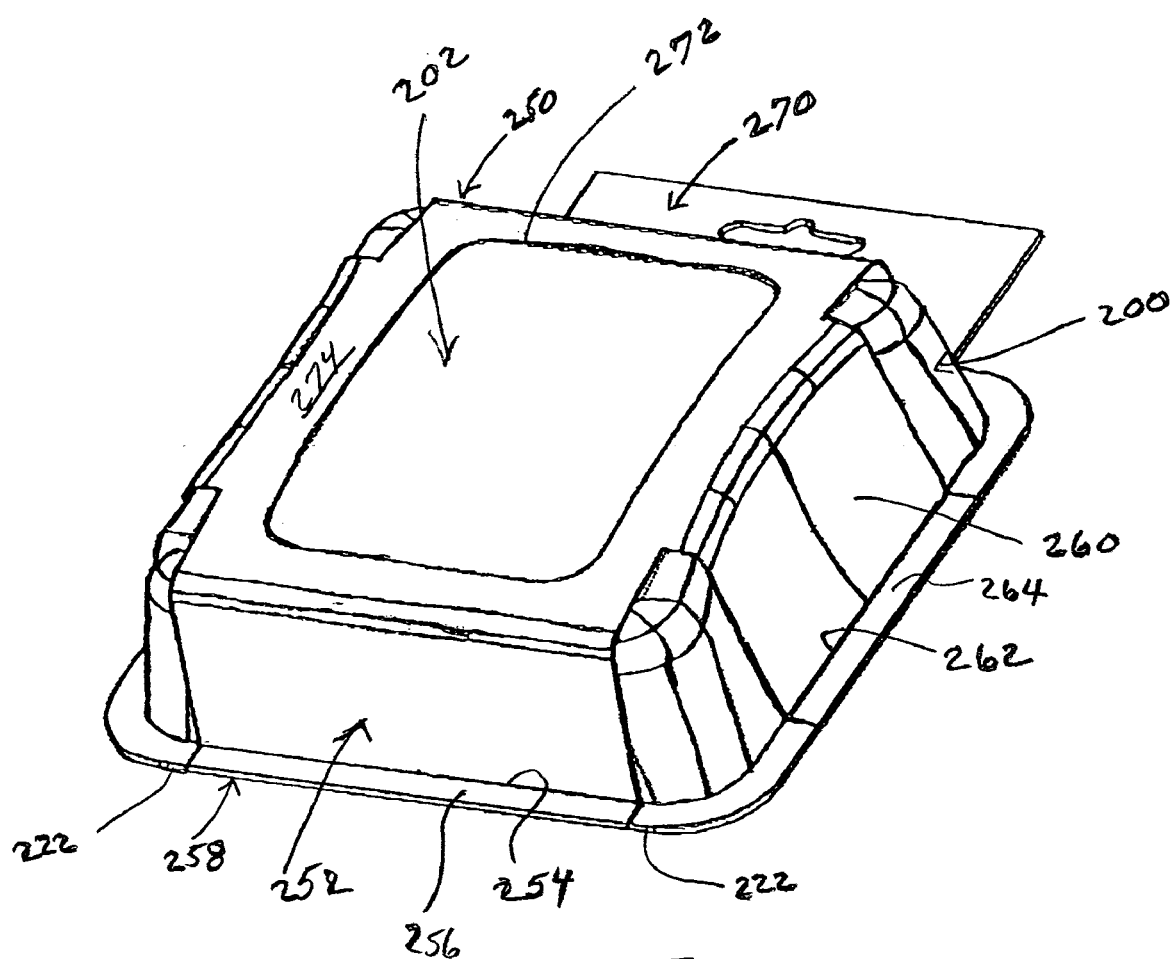
FIG. 6 is a schematic perspective view of the packaging embodying the present invention showing the pre-shaped inner part of FIG. 5 encased and captured by the outer cover.

Turning now to FIG. 6, a schematic perspective view embodying the packaging of the present invention showing the pre-shaped inner part 200 illustrated in FIG. 5 encased and captured by the outer cover 250 is illustrated therein. The final packaging illustrated in FIG. 6 is similar to the configuration illustrated in FIG. 4. The outer cover 250 includes a lower band portion 252 folded along a pre-determined crease line 254 to fold a portion 256 of the band 252 inwardly onto and in communication with the bottom of the outer cover 250. The width of the band 252 is contemplated to fit in the notch or cut-out area 258 defined between the two corners 222, 222 of the inner part 200 in the region of the band 252. The portion 256 of the band 252 has its interior side surface coated with an appropriate and suitable adhesive to bond to the bottom of the outer cover 250 such that the portion 256 tightens the band portion 252 to hold the portion 256 against the bottom surface. The cover 250 also includes a band portion 260 transverse to the band portion 252 and at the side of the inner part 200. Likewise, the side band portion 260 is folded along the pre-defined crease line 262 inwardly to draw down and tighten the side band portion of the outer cover 250 along the side of the inner part 200. The interior side surface of the portion 264 of the band portion 260 is coated with a suitable adhesive to bond or otherwise hold the portion 264 in contact against and with the bottom of the outer cover 250. The band portion on the side opposite the band portion 260 is likewise similarly folded along a pre-defined crease line and drawn down to tighten the outer cover against the inner part to hold it. A hanging tab portion 270 may be provided for holding and displaying the packaging on hooks. The outer cover 200 further includes a window or aperture 272 in the upper wall surface 274 so that an article carried within the cavity 202 of the inner part 200 is visible.

Figure 7:
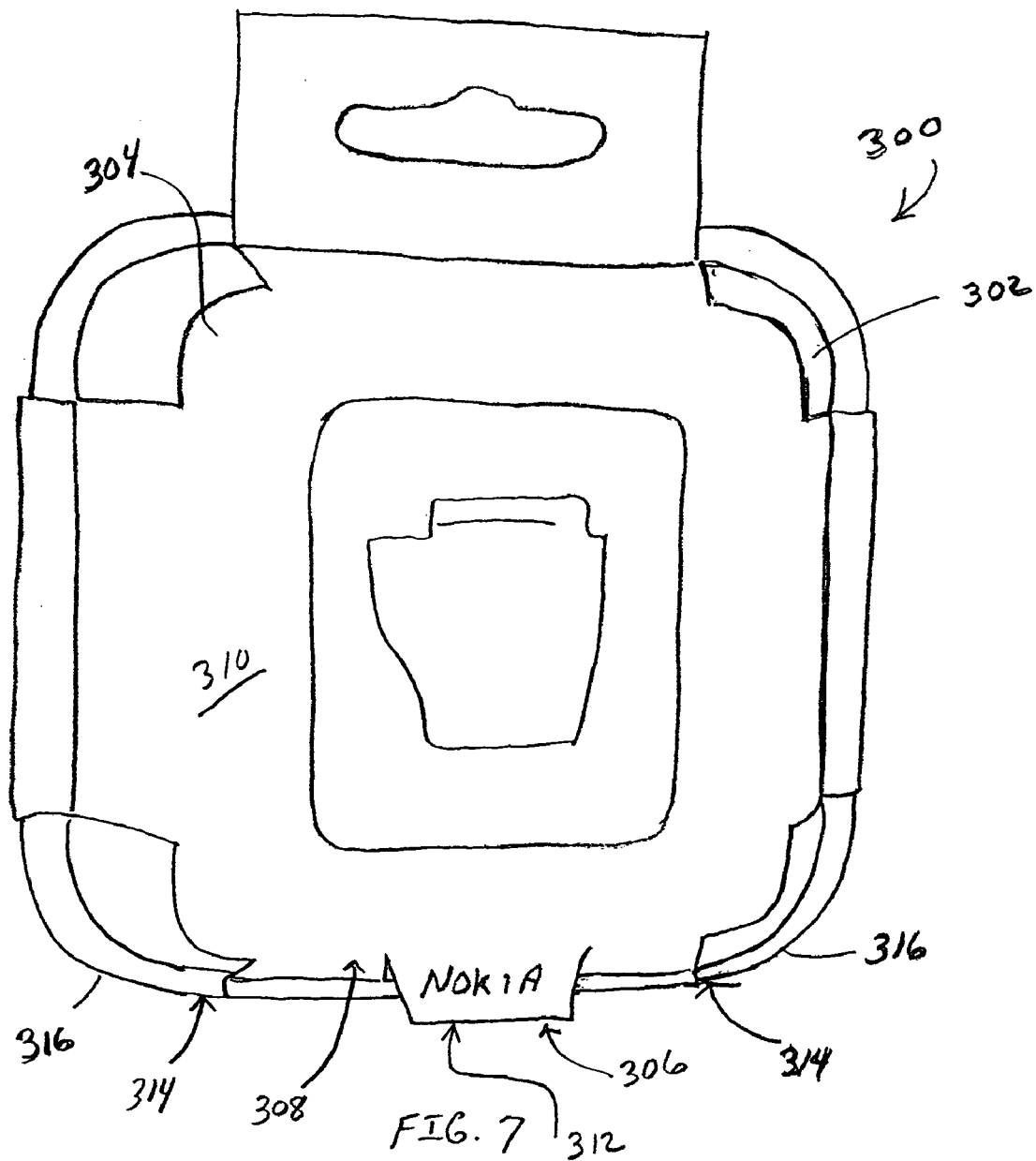
FIG. 7 is a perspective front view of the packaging embodying the present invention showing the packaging in a stand-alone orientation.

Turning now to FIG. 7, a perspective front view of the packaging embodying the present invention is illustrated therein and generally designated 300 and includes a pre-shaped inner part 302 encased and captured by an outer cover 304 in a similar manner as described above. In FIG. 7, the cover 304 includes a leg portion 306 which is formed as a flap in the band portion 308 of the cover 304 and extends outwardly from the outer cover 304 and substantially in the same plane as the surface 310 of the cover 304. The packaging 300 is thus displayable in the stand-alone orientation with the packaging resting on the end edge 312 of the leg portion 306 and the peripheral edge portion 314 of the extended corners 316, 316 respectively of the pre-shaped inner part 302.

Figures 8B, 8C:
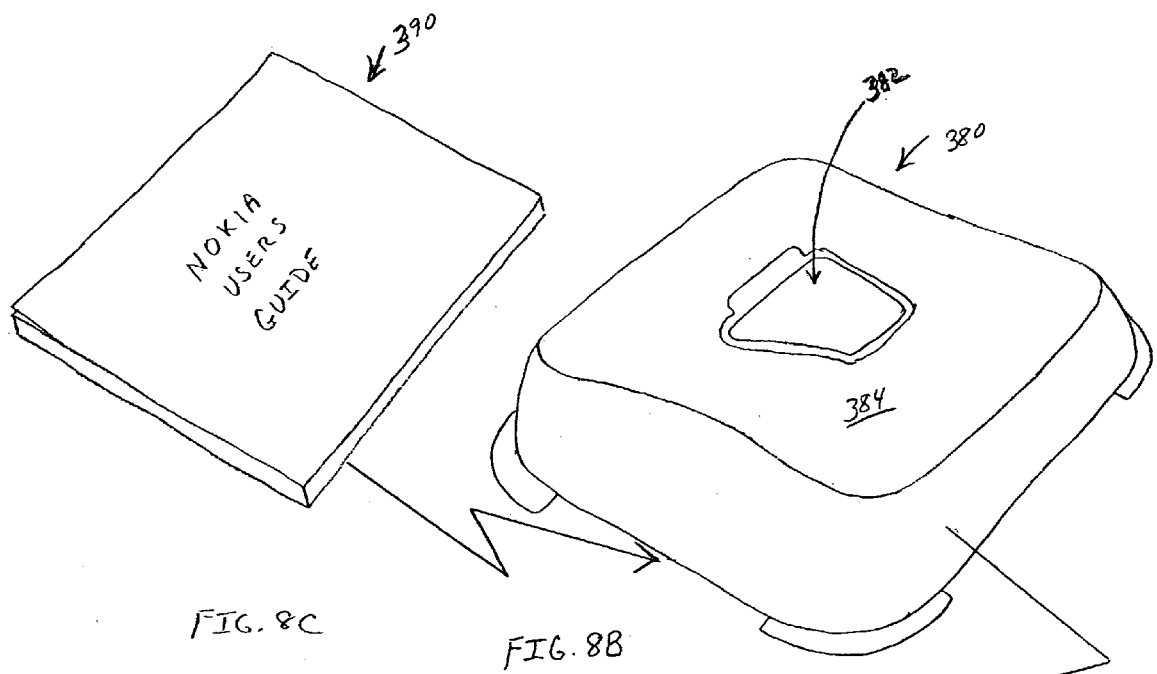
FIG. 8A-8C illustrate the packaging embodying the present invention wherein the outer cover part shown in FIG. 8A receives a clear plastic inner part shown in FIG. 8B wherein a users manual shown in FIG. 8C is inserted beneath and can be visible through the clear plastic part or hidden under a colored plastic or molded pulp inner part when the packaging is sealed.
Figure 8A:
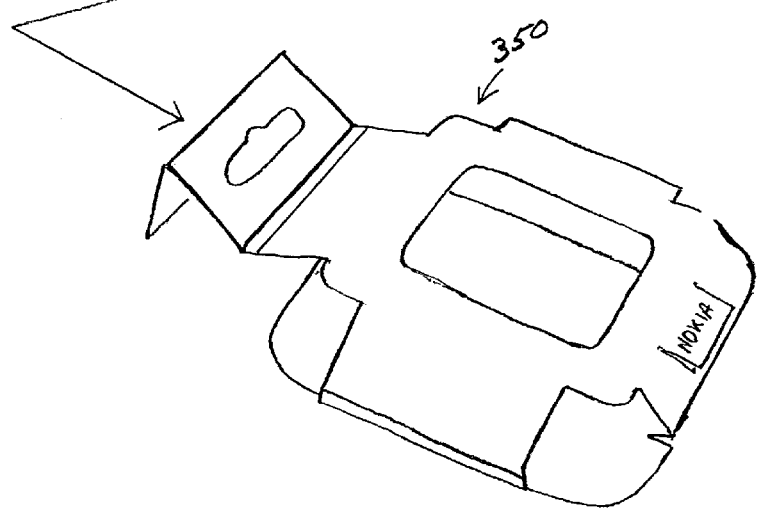

Turning now to FIGS. 8A-8C, packaging embodying the present invention is illustrated therein wherein the outer cover part generally designated 350 in FIG. 8A receives a pre-shaped inner part generally designated 380 in FIG. 8B of any suitable material including paper pulp, colored paper pulp, clear or colored plastic, PLA, or other materials well known as those skilled in the art to carry out the intended function. As illustrated, a user's manual for example designated 390 in FIG. 8C may be inserted beneath the pre-shaped inner part 380 and is either visible through a clear plastic pre-shaped inner part or hidden with use of non-transparent materials of the pre-shaped inner part when the outer cover part 350 is sealed to form the final packaging configuration. A clear plastic or other transparent material well known to those skilled in the art to carry out the intended function can be used for the pre-shaped inner part when the user manual or/and printed inner side of the outer cover part generally designated 350 is intended to be shown as part of the packages graphical presentation. The outer part 350 is constructed and operates in a similar manner to the outer cover parts described above and as illustrated in FIG. 8A is expanded from its folded or collapsed state to receive the pre-shaped inner part 380. The pre-shaped inner part 380 features a cavity or chamber 382 defined within the body and on the surface 384 of the pre-shaped inner part to hold and carry an article inserted therein. The outer cover 350 is made of any suitable material including paper pulp, colored paper pulp, clear or colored plastic, PLA, or other materials well known as those skilled in the art to carry out the intended function.

Figure 9:
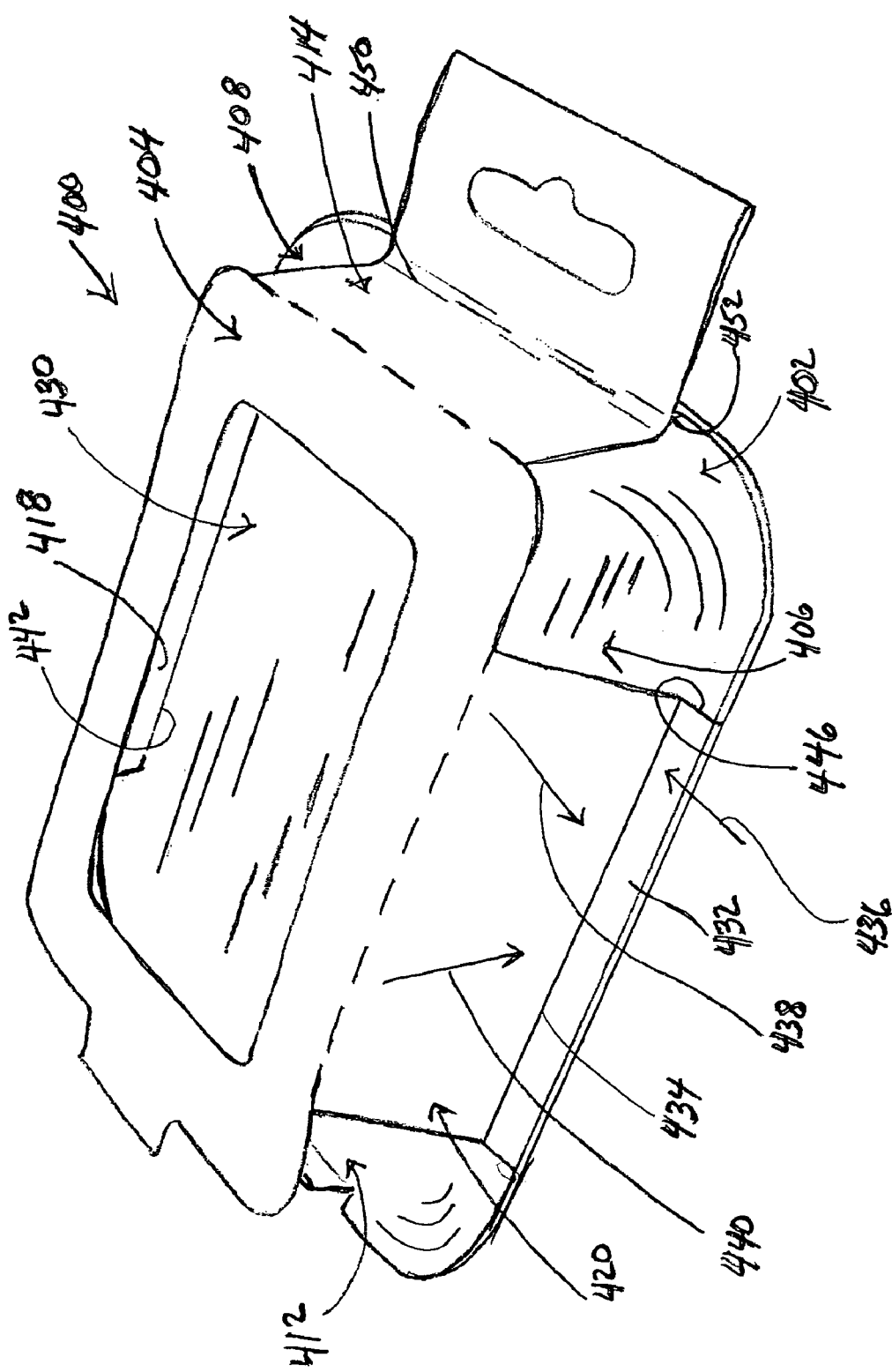
FIG. 9 is a schematic perspective view of an alternate embodiment of the outer cover part of the packaging embodying the present invention viewed from the hanging tab end.
Figure 10:
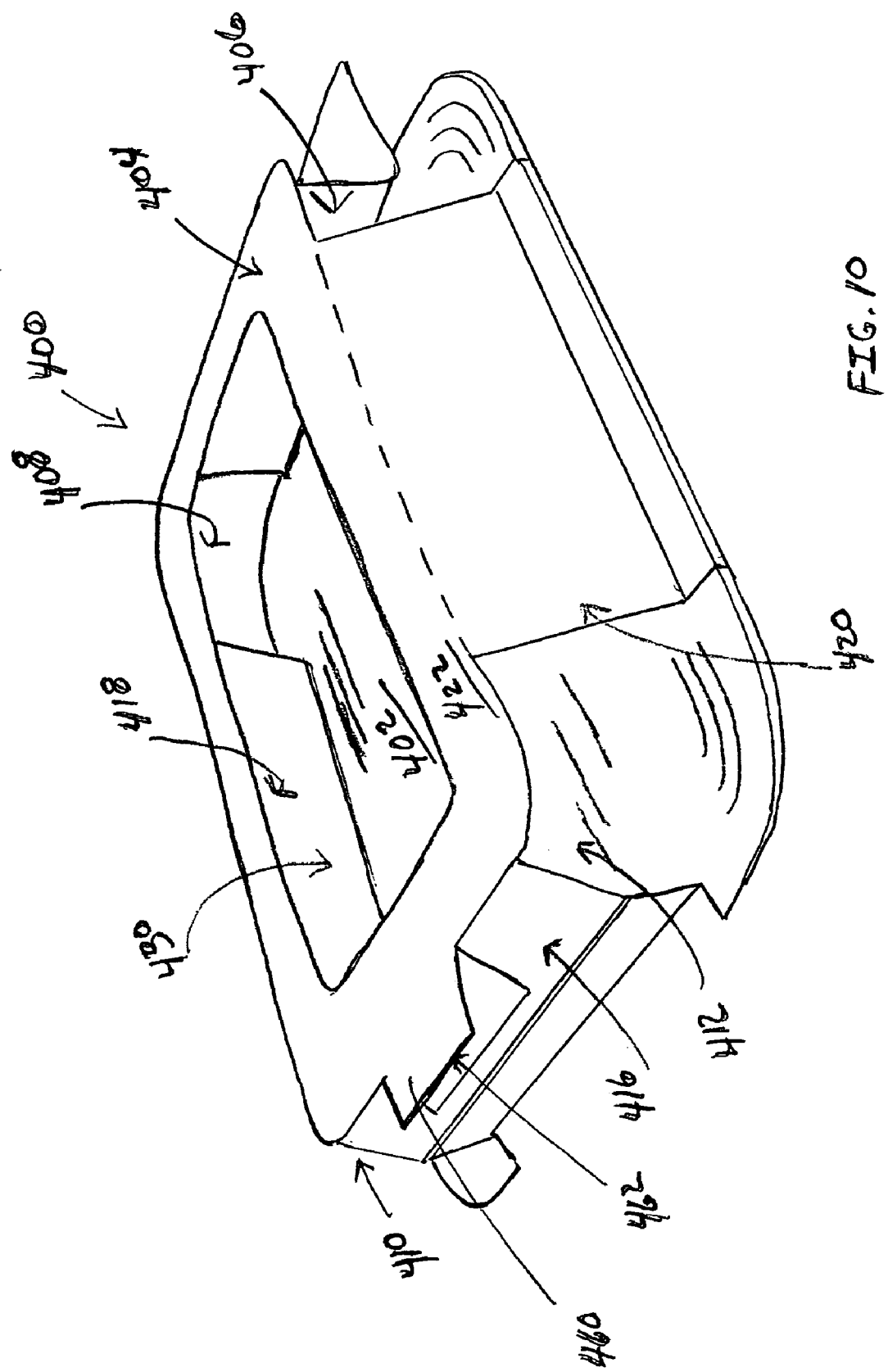
FIG. 10 illustrates the outer cover part of FIG. 9 viewed from the standing leg portion end.

Turning now to FIGS. 9 and 10, an alternate embodiment of the outer cover part of the packaging of the present invention is illustrated therein and generally designated 400. The outer cover 400 is arranged to receive and hold a pre-shaped inner part such as the inner part illustrated in FIGS. 2, 5 and 11 although the pre-shaped inner part is not shown within the outer cover part 400 of FIGS. 9 and 10. The outer cover 400 includes a bottom or floor 402, an upper cover portion 404 having notches 406, 408, 410 and 412 cut from respective corners of the material forming the cover 404. The upper cover 404 includes a hanging tab portion generally designated 414, a standing leg portion generally designated 416 and two side tab portions generally designated 418, 420 respectively disposed opposite one another. The outer cover part 400 includes a window or aperture 430 through the upper cover portion 404 in general or partial alignment with the cavity defined within the pre-shaped inner part. Although window or aperture 430 is illustrated in FIGS. 9 and 10, the upper cover portion 404 may be a continuous surface made from the material forming the cover and thereby conceal if desired the article carried by the pre-shaped inner part. In contrast to the embodiments of the outer cover parts described above, the pre-shaped inner part is enclosed or encased and securely held by drawing down and tightening the side tab portions 418 and 420 around the side walls of the pre-shaped inner part. The extended corners for example 222, 222 as illustrated in FIG. 5 extend outwardly from each bottom corner of the pre-shaped inner part and into the respective notches 406, 408, 410, 412 when the pre-shaped inner part is placed within the outer cover part 400. The side tab portion 420 is folded along a pre-defined crease line 434 such that a portion 432 of the material defining the cover portion 404 folds inwardly in a direction indicated by arrow 436 and into the cut out area between the extended corners 222, 222 of the pre-shaped inner part to draw down and tighten the cover 404 in a general direction indicated by the arrows 438, 440. The side tab portion 418 is folded along pre-defined crease line 442 in a similar manner such that the material defining the cover portion 404 folds inwardly and into the cut out area between the extended corners 222, 222 of the pre-shaped inner part. The interior side surface 446 of the portion 432 of the material defining the upper cover portion 404 is prepared with a suitable adhesive, preferably heat sealable, prepared an appropriately applied on the interior side surface to create a bond between the portion 432 and the bottom 402 of the outer cover part. The flange portion of the side tab portion 418 is similarly bonded to the bottom 402 of the outer cover part 400. It can be seen that the sides 418, 420 will tighten around the side walls of the pre-shaped inner part and lock the extended corners to prevent the pre-shaped inner part from being slid out of the outer cover part 400 without tearing or otherwise ripping or destroying the material of the outer cover part. It can likewise be seen that the standing leg portion 416 of the material defining the upper cover portion 404 likewise fits in the notch or cut out between the extended corners 222, 222 of the pre-shaped inner part to further prevent the pre-shaped inner part from being removed from the outer cover 400 without tearing or otherwise ripping the material. The material forming the hanging tab portion 414 is similarly folded along a pre-defined crease line 450 and a suitable adhesive, preferably heat sealable is prepared appropriately and applied on the interior side surface 452 to bond the portion of the hanging tab portion 414 to the bottom 402 of the outer cover 400. Likewise, the material forming the hanging tab portion 414 fits in the cut out between the extended corners 222, 222 of the pre-shaped inner part held by the outer cover 400. The material defining the standing leg portion 416 includes a foot 460 which is formed as a flat in the standing leg portion 416 of the cover 404 and extends outwardly from the outer cover 404 and substantially in the same plane as the surface 422 of the cover 404. The completed packaging comprising the outer cover part 400 and the incased pre-shaped inner part is thus displayable in the stand alone orientation of the packing resting on the end edge 462 of the foot 460 and the peripheral edge portion of the extended corners of the pre-shaped inner part incased by the outer cover.

Figure 11:
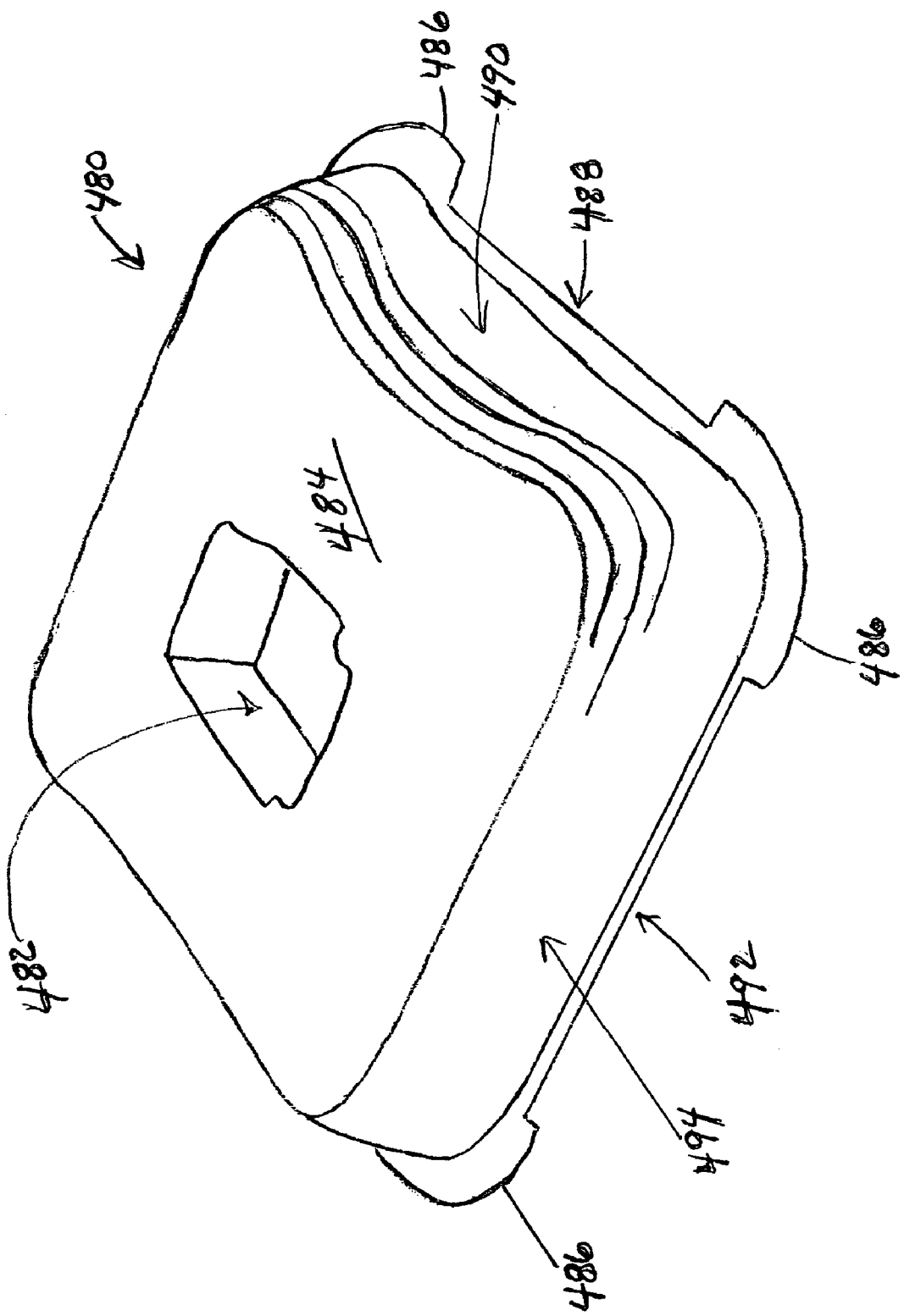
FIG. 11 is a schematic perspective view of a further alternate embodiment of the pre-shaped inner part of the packaging embodying the present invention.

FIG. 11 is a schematic perspective view of a further alternate embodiment of the pre-shaped inner part of the packaging embodying the present invention and is designated generally 480. The pre-shaped inner part 480 includes a cavity 482 for carrying an article or a product wherein the cavity is upwardly open to a surface 484. The pre-shaped inner part includes extended corners 486, 486 and define cut out regions 488 on one side 490 and a similar cut out on the side opposite 490, and a cut out area or region 492 on the side 494 with a similar cut out being defined between the extended corners 486, 486 on the side opposite the side 494. The pre-shaped inner part 480 may be a molded form such as made from a closed cell polyethylene material or may be of any suitable material including paper pulp, colored paper pulp, clear or colored plastic, PLA or other materials well known to those skilled in the art to carry out the intended function. Likewise, the material of the outer cover 404 may be made of any suitable material including paper pulp, colored paper pulp, clear or colored plastic, PLA or other materials well known to those skilled in the art to carry out the intended function.

It will be recognized that the packaging embodying the present invention may be of other geometric configurations than that illustrated above for purposes of example and that multiple color and material combinations may be used to present the desired visible image for a given product or sales promotion for example. Likewise, the outer cover may be of a clear transparent material to permit viewing of an article carried by the packaging to be visible without the addition of a viewing window or aperture in the outer cover. Accordingly, the packaging embodying the present invention has been presented by way of illustration rather than limitation.

The invention claimed is:

1. Packaging for an article, the packaging comprising:
a pre-shaped inner part including a cavity defined therein for carrying the article; and a loose outer part for receiving the pre-shaped inner part comprising a bottom portion and an upper portion, said upper portion further comprising oppositely disposed lengthwise ends attached to respective ends of said bottom portion and oppositely disposed transverse ends attached to respective sides of said bottom portion, said loose outer part having a number of predetermined crease lines each of which is inward of an edge defined along a respective corresponding end of said bottom portion and along a respective corresponding side of said bottom portion for folding along said respective predetermined crease lines for drawing down and for tightening said loose outer part around said pre-shaped inner part to seal-close said pre-shaped inner part within said tightened loose outer part such that said tightened loose outer part must be broken to remove the article carried by said pre-shaped inner part.

2. The packaging as defined in claim 1, wherein said pre-shaped inner part further comprises two oppositely disposed sidewalls, a top end wall transverse to and intersecting with one end of said sidewalls, a bottom end wall transverse to and intersecting with the end of said sidewalls opposite said one end, said top end wall, bottom end wall and side walls having inner and outer wall surfaces defining a thickness there between, said sidewalls further being defined by a narrower thickness intermediate said ends than the thickness of the wall at said ends such that said pre-shaped inner part remains seal-closed within said tightened loose outer part when said tightened loose outer part is broken in the region corresponding to said pre-shaped inner part top end wall and bottom end wall.

3. The packaging as defined in claim 1, wherein said loose outer part further includes a leg portion extending from said loose outer part such that said packaging is further configured and arranged for placement in a standing orientation supported by said leg portion and the bottom end wall of said pre-shaped inner part.

4. The packaging as defined in claim 1, wherein said pre-shaped inner part is made of paper pulp.

5. The packaging as defined in claim 1, wherein said pre-shaped inner part is made of plastic.

6. The packaging as defined in claim 1, wherein said pre-shaped inner part is made of PLA.

7. The packaging as defined in claim 1, wherein said pre-shaped inner part further comprises an outer piece and an inner piece wherein said inner piece comprises said cavity.

8. The packaging as defined in claim 7, wherein said pre-shaped part outer piece is made of paper pulp.

9. The packaging as defined in claim 8, wherein said paper pulp is colored.

10. The packaging as defined in claim 7, wherein said inner piece is made of clear plastic.

11. The packaging as defined in claim 7, wherein said inner piece is made of colored plastic.

12. The packaging as defined in claim 7, wherein said inner piece is made of PLA.

13. The packaging as defined in claim 10, wherein said inner piece is arranged to carry desired documentation.

14. The packaging as defined in claim 7, wherein said outer piece has oppositely disposed outer wall surfaces having a shape and contour such that the wall surface tapers inwardly from its outer ends.

15. The packaging as defined in claim 1, wherein said loose outer part is made of a suitable sheet material.

16. The packaging as defined in claim 15, wherein said sheet material is a carton.

17. The packaging as defined in claim 15, wherein said sheet material is paper.

18. The packaging as defined in claim 15, wherein said sheet material is corrugated board.

19. The packaging as defined in claim 15, wherein said sheet material is plastic.

20. The packaging as defined in claim 1, wherein said loose outer part further includes a hanging slot.

21. Packaging for an article, the packaging comprising:
a pre-shaped substantially rectangular inner part having a top and a bottom and a cavity defined therein for carrying the article, said inner part having a peripheral flange along the bottom edge of said inner part,
a collapsible cover for encasing said pre-shaped inner part, said cover further comprising a bottom portion and an upper portion comprising a lengthwise band having respective ends attached to respective ends of said bottom portion and a transverse band having respective ends attached to respective sides of said bottom portion, said lengthwise band further having a first predetermined crease line inward of an edge defined along said one end and a second predetermined crease line inward of an edge defined along an end opposite said one end, said transverse band having a third predetermined crease line inward of an edge defined along one respective side of said bottom portion and a fourth predetermined crease line inward of an edge defined along the other respective side of said bottom portion, said lengthwise band and said transverse band being folded along said predetermined crease lines to tighten said cover around said pre-shaped inner part.

22. The packaging as defined in claim 21, wherein an inner facing surface area corresponding to the portions of the lengthwise band and transverse band respectfully carries an adhesive for bonding said inner facing surface areas to said cover bottom portion to seal-close said pre-shaped inner part within said cover whereby said cover must be broken to remove the article carried by said pre-shaped inner part.

* * * * *